United States Patent

Blanchet et al.

[11] Patent Number: 5,857,328
[45] Date of Patent: Jan. 12, 1999

[54] EXHAUST MANIFOLD CATALYTIC CONVERTER

[75] Inventors: Scott Christopher Blanchet, Imlay City; Wayne Richard Moore, Goodrich; Russell Paul Richmond, Clifford, all of Mich.

[73] Assignee: General Motors Corporation, Detroit, Mich.

[21] Appl. No.: 977,673

[22] Filed: Nov. 24, 1997

[51] Int. Cl.$^6$ ............................... F01N 3/20; F01N 3/28
[52] U.S. Cl. ................. 60/302; 60/299; 422/180
[58] Field of Search ..................... 60/299, 302; 422/180

[56] References Cited

U.S. PATENT DOCUMENTS

| | | | |
|---|---|---|---|
| 3,694,325 | 9/1972 | Katz et al. | 205/75 |
| 4,530,418 | 7/1985 | Currie | 181/227 |
| 4,920,746 | 5/1990 | Gebelius | 60/299 |
| 5,497,619 | 3/1996 | Yamada et al. | 60/279 |
| 5,546,748 | 8/1996 | Iwai et al. | 60/302 |
| 5,562,510 | 10/1996 | Suzuki et al. | 440/89 |
| 5,648,050 | 7/1997 | Matsumoto et al. | 422/180 |

FOREIGN PATENT DOCUMENTS

| | | |
|---|---|---|
| 97/30797 | 8/1997 | WIPO . |
| 97/31738 | 9/1997 | WIPO . |
| 97/32119 | 9/1997 | WIPO . |

*Primary Examiner*—Tony M. Argenbright
*Attorney, Agent, or Firm*—Anthony Luke Simon

[57] ABSTRACT

An exhaust manifold catalytic warm-up converter for an automotive vehicle engine includes tubular runners having inlet and outlet ends and connectable at their inlet ends with exhaust ports of an engine. The runners are joined at their outlet ends with a common exhaust outlet. A generally helical twisted tape extends longitudinally in each of the runners between their inlet and outlet ends and laterally divides the runners into at least two parallel generally helical flow passages. The tape is porous and formed of a material having a predetermined thickness and porosity to encourage a flow of exhaust gases through pores of the tape between adjacent helical passages due to pressure gradients across the tape resulting from gas flow in the helical passages. The porous tape has a low thermal inertia for fast warm-up and is coated with a catalytic material for stimulating reaction of emissions in the engine exhaust gases passing through the exhaust manifold. Additional features and alternatives are disclosed.

7 Claims, 2 Drawing Sheets

EXHAUST MANIFOLD CATALYTIC CONVERTER

TECHNICAL FIELD

This invention relates to exhaust manifold mounted catalytic converters for automotive vehicle engines.

BACKGROUND

Catalytic converters used with automotive vehicle engines have been used in exhaust emission control for many years. While they are very effective at operating temperatures, many current systems are known to take 40–90 seconds to warm up under U.S. Federal Test Procedure (FTP) conditions. As a result, 70–90 percent of tailpipe emissions on FTP may occur before the catalyst is warmed to effective operation.

SUMMARY OF THE INVENTION

Advantageously, the present invention provides a converter formed within an engine exhaust manifold where it is exposed to high temperature engine exhaust gases as soon as they leave the engine exhaust ports. The converter may be used in a system with an underfloor catalytic converter in order to both initiate early catalytic action in the manifold converter and, by this action, reduce the time needed for warm up of the underfloor converter. If desired the manifold converter could also be used with other arrangements of main or supplemental converters located downstream of the manifold converter in the exhaust system of an engine.

Advantageously, the manifold converter of the invention includes thin strips or tapes of porous material such as reticulated metal foam. These are twisted into a helical shape and fixed within each of the runners of the manifold, extending laterally across and longitudinally along each runner to divide its interior into at least two helically shaped parallel passages separated by the porous tape.

Advantageously, the tapes are coated with a catalytic material and have low thermal inertia so that, in operation, they are quickly heated to operating temperature by the high temperature exhaust gases. Then, thermal reactions with exhaust emissions of hydrocarbons and carbon monoxide increase the gas temperatures further, causing the underfloor or other catalytic converter located downstream in the exhaust system to reach its operating temperature more quickly than without a manifold converter. Thus, reactions are accelerated and warm-up tailpipe emissions are reduced.

If desired, the manifold converter may also be provided with wall mounted catalyst coated sheets of porous material like that in the helical tapes but covering the internal surfaces of the manifold runners to increase the emission reactions taking place in the warm-up converter.

If the manifold converter is to be used in an exhaust system which has an engine control sensor between the manifold and downstream converters, the catalytic coating for the tapes should be of a non-oxygen storing type to avoid changing the exhaust oxygen level at the sensor and sending erroneous readings to the engine control.

In example operation, pressure gradients across the twisted porous catalytic tape cause some of the exhaust gases to flow through the tape, fully exposing the gases to the reacting catalyst. To maximize this flow, and catalytic effect, the tape may have a thickness of ⅛ to ½ inch and a foam pore density chosen to yield 10–20 pores in series across the thickness of the tape. The number of helical twists in the tape (a function of the lead or lead angle of the helix) is preferably chosen to optimize the conversion efficiency of the catalyst, which should be high, and the resulting manifold restriction, which should remain low.

BRIEF DESCRIPTION OF THE DRAWINGS

The present invention will now be described by way of example with reference to the following drawings in which.

DETAILED DESCRIPTION OF THE DRAWINGS

Figure 1:
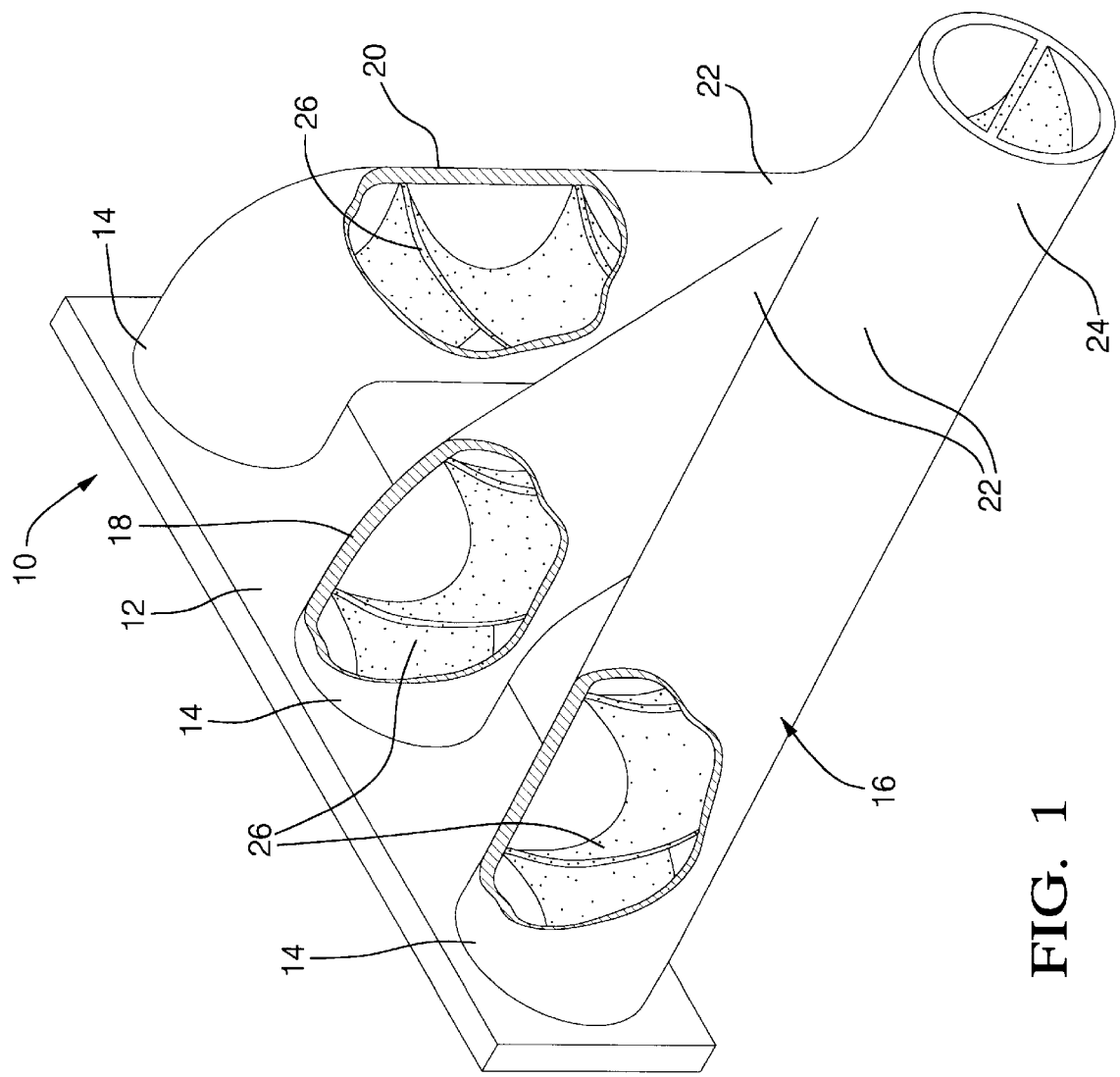
FIG. 1 is a pictorial view of an example fabricated steel engine exhaust manifold having tubular runners with internal helical catalytic tapes according to the invention.

Referring now to the drawings in detail, numeral 10 generally indicates a fabricated steel engine exhaust manifold for use on one bank of a V-6 automotive vehicle engine. Manifold 10 includes a common flange 12 welded to inner ends 14 of three tubular runners 16, 18, 20. Outer ends 22 of the runners are joined to a common outlet pipe 24. The outlet pipe 24 is connectable to an exhaust pipe, not shown, or other component, of a vehicle engine exhaust system leading to a downstream catalytic converter, not shown, generally mounted under the floor of an associated vehicle.

Figure 2:
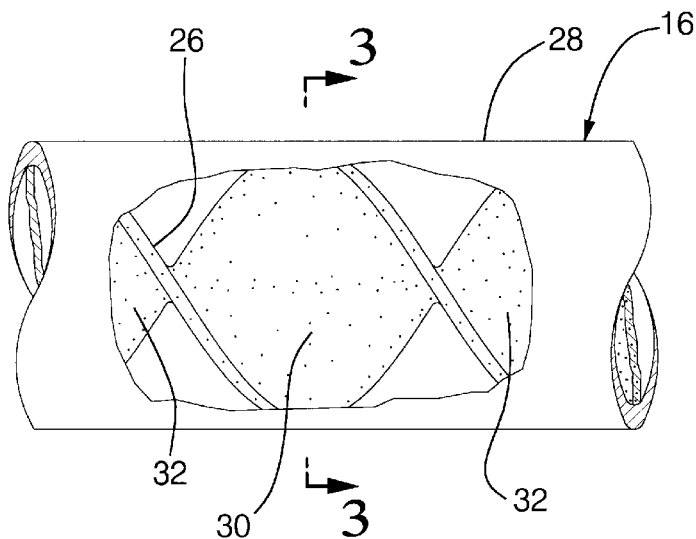
FIG. 2 is a fragmentary side view of an example manifold runner broken away to show the interior construction.
Figures 3, 5:
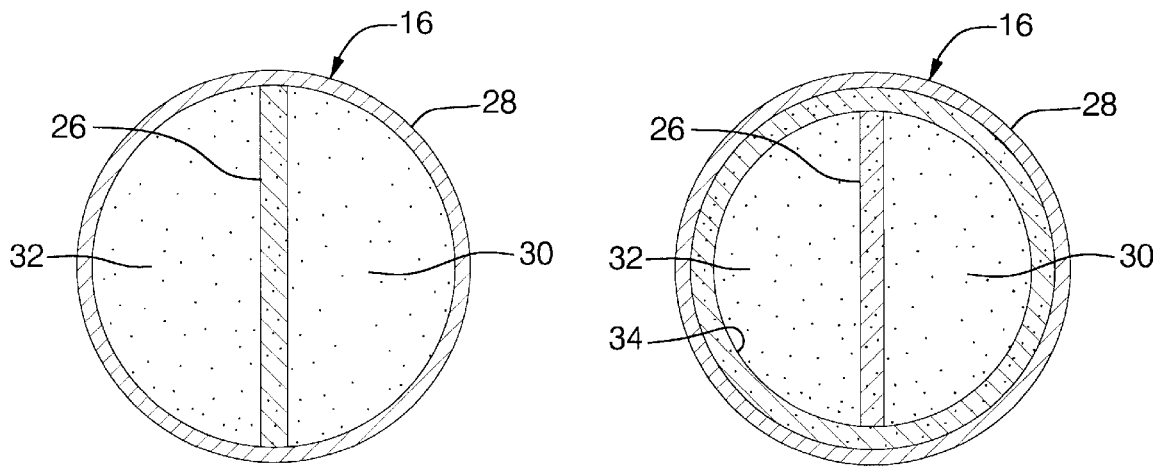
FIG. 3 is a cross-sectional view from the line 3—3 of FIG. 2.
FIG. 5 is a cross-sectional view similar to FIG. 3 but showing an alternative example.
Figure 4:
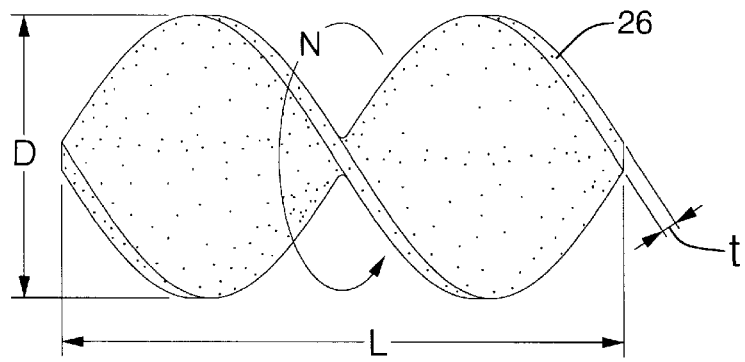
FIG. 4 is a side view of an example section of a twisted foam tape for use in a manifold runner.

Mounted within each of the manifold runners 16, 18, 20 is a helical twisted tape 26 as shown separately in FIG. 4. FIGS. 2 and 3 illustrate the mounting of the twisted tape 26 within the runner 16 of FIG. 1, which is exemplary of the mounting in the other runners. Manifold runner 16 has a tubular wall 28 within which the twisted tape 26 extends diametrically across the hollow interior and longitudinally along the length of the runner, thereby dividing the runner into two semicircular parallel helical flow passages 30, 32 extending the length of the runner 16.

The tape 26 is formed of a porous material that is resistant to the high exhaust temperatures and has predetermined thickness t and porosity which, together with its length L, width or diameter D and number of twists or turns N, are chosen to encourage a flow of exhaust gases through pores of the tape between the adjacent helical passages 30, 32. This flow of exhaust gases through the porous tape occurs due to pressure gradients across the tape between the adjacent passages and resulting from the exhaust gas flow through the passages. The porous tape has a low thermal inertia for fast warm-up and is coated with a suitable catalytic material, such as a thermally stable low mass catalyst of a known type, that aids the reaction of emissions in the engine exhaust gases flowing through the manifold. Reticulated metallic foam is a material considered suitable for use as the porous tape. The catalyst coating may also be selected to best suit the application. For installations where an engine control sensor is located downstream of the warm-up converter, a non-oxygen storing catalyst of a known type should be chosen to avoid distorting the engine control factors sensed by the sensor.

In a typical application, the thickness t of the tape would be in the range from ⅛ to ½ inch and the porosity would be chosen to have from 10 to 20 pores in series across the thickness of the tape. Too few pores would not provide adequate gas contact with the catalyst to obtain the desired reactions while too many pores or an excessive thickness could excessively restrict gas flow through the tape with a similar result of reduced reactions. The number of twists or turns in the helical tapes must also be suited to the application as affected by gas flow and the length and area or diameter of the runners. Too many twists may create an excessive pressure drop through the manifold, causing excessive back pressure in the engine exhaust ports. Too few twists may not provide sufficient pressure gradient across the tape to provide the desired flow therethrough. The optimum values for all these factors may be determined by one skilled in the art using an example manifold 10 and a test engine of the type for the application desired.

Exhaust manifolds according to the invention may be made by any suitable manufacturing methods. For example, the helical tapes could be cast in place during casting of a manifold. In a fabricated steel manifold such as that of FIG. 1, the tapes may be installed in the individual runner tubes either before or after the tapes are twisted to the desired helix. The runner tubes may then be bent into their final configurations and welded together with the other components to form the finished manifold 10.

FIG. 5 illustrates an alternative embodiment runner wherein an additional porous catalytic sheet 34 is applied to the interior of the runner walls 28, thus forming the periphery of the semi-circular passages separated by the tape 26. The sheet 34 may be formed of a similar material and coated with a similar catalyst to those of the tape 26. However, the additional catalytic action provided will be limited by surface contact with the peripheral sheet as opposed to the through flow passage of gases through the tape 26. Here, the value of the additional emission control must be balanced against the additional flow restriction imposed upon the system by the porous surface of the peripheral sheet 34.

While the invention has been described by reference to certain selected embodiments, it should be understood that numerous changes could be made within the spirit and scope of the inventive concepts described. Accordingly it is intended that the invention not be limited to the disclosed embodiments, but that it have the full scope permitted by the language of the following claims.

We claim:

1. An exhaust manifold catalytic converter for an automotive vehicle engine, said converter comprising:

a plurality of tubular runners having inlet and outlet ends and connectable at their inlet ends with exhaust ports of an engine, said runners being joined at their outlet ends with a common exhaust outlet;

a generally helical twisted tape extending longitudinally in each of said runners between their inlet and outlet ends, said tape laterally dividing the runners into at least two parallel generally helical flow passages;

said tape being porous and formed of a material having a predetermined thickness and porosity to encourage a flow of exhaust gases through pores of the tape between adjacent helical passages due to pressure gradients across the tape resulting from gas flow in the helical passages, said porous tape having a low thermal inertia for fast warm-up and being coated with a catalytic material for stimulating reaction of emissions in the engine exhaust gases passing through the exhaust manifold.

2. A catalytic converter as in claim 1 wherein said tape comprises strips of reticulated foam.

3. A catalytic converter as in claim 1 wherein the catalytic coating on the tape is a thermally stable low mass catalyst.

4. A catalytic converter as in claim 1 wherein said tape has a thickness that provides through flow paths for gases of at least 10 pores connected in series across the tape.

5. A catalytic converter as in claim 4 wherein said tape thickness is in the range from ⅛ to ½ inch.

6. A catalytic converter as in claim 1 wherein said tubular runners have internal surfaces which are covered with a porous catalytic material.

7. A catalytic converter as in claim 1 wherein said catalytic material is of a non-oxygen storing type.

\* \* \* \* \*